(12) United States Patent
Lemkin et al.

(10) Patent No.: US 8,325,704 B1
(45) Date of Patent: Dec. 4, 2012

(54) TIME CORRECTION AND DISTANCE MEASUREMENT IN WIRELESS MESH NETWORKS

(75) Inventors: Mark Lemkin, Berkeley, CA (US); Maxim Moiseev, Sunnyvale, CA (US)

(73) Assignee: Dust Networks, Inc., Hayward, CA (US)

( * ) Notice: Subject to any disclaimer, the term of this patent is extended or adjusted under 35 U.S.C. 154(b) by 1048 days.

(21) Appl. No.: 12/148,412

(22) Filed: Apr. 18, 2008

Related U.S. Application Data

(60) Provisional application No. 60/930,600, filed on May 16, 2007.

(51) Int. Cl.
*H04J 3/06* (2006.01)
(52) U.S. Cl. .................. 370/350; 370/347; 370/395.62; 370/522
(58) Field of Classification Search .................. 370/350, 370/389, 395.62, 503, 509, 347, 522; 375/219, 375/326, 355; 455/41.2; 713/400
See application file for complete search history.

(56) References Cited

U.S. PATENT DOCUMENTS

| | | | |
|---|---|---|---|
| 7,664,204 B1 * | 2/2010 | Wang et al. ................. 375/326 |
| 2003/0056136 A1 * | 3/2003 | Aweya et al. ................ 713/400 |
| 2005/0018762 A1 * | 1/2005 | Aiello et al. ................ 375/219 |
| 2005/0135527 A1 * | 6/2005 | Masui et al. ................ 375/355 |
| 2005/0197064 A1 * | 9/2005 | Ibrahim et al. ............. 455/41.2 |
| 2006/0233291 A1 * | 10/2006 | Garlepp et al. ............ 375/355 |

* cited by examiner

*Primary Examiner* — Hassan Kizou
*Assistant Examiner* — Toan Nguyen
(74) *Attorney, Agent, or Firm* — McDermott Will & Emery LLP

(57) ABSTRACT

Correcting a time of reception of a data packet is disclosed. A radio-frequency input is converted to a data-output signal. A data clock is recovered from the data-output signal. A phase offset is measured between the data-output signal and the data clock. A time of reception is corrected based at least in part on a timestamp. The timestamp is a sampled value of a counter at a time of reception of a data packet and the phase offset. The time correction can be used to calculate a distance estimate.

17 Claims, 20 Drawing Sheets

| LENGTH |
| --- |
| SLAVE_TIME[3] |
| SLAVE_TIME[2] |
| SLAVE_TIME[1] |
| SLAVE_TIEM[0] |
| MASTER_TX_TIMESTAMP[3] |
| MASTER_TX_TIMESTAMP[2] |
| MASTER_TX_TIMESTAMP[1] |
| MASTER_TX_TIMESTAMP[0] |
| PAYLOAD[4]... PAYLOAD[LENGTH-1] |
| CRC16[0] |
| CRC16[1] |

FIG. 9A

| TCNT_TIMESTAMP[2] |
| --- |
| TCNT_TIMESTAMP[1] |
| TCNT_TIMESTAMP[0] |
| MASTER_RX_TIMESTAMP[3] |
| MASTER_RX_TIMESTAMP[2] |
| MASTER_RX_TIMESTAMP[1] |
| MASTER_RX_TIMESTAMP[0] |
| LENGTH |
| SLAVE_TIME[3] |
| SLAVE_TIME[2] |
| SLAVE_TIME[1] |
| SLAVE_TIEM[0] |
| MASTER_TX_TIMESTAMP[3] |
| MASTER_TX_TIMESTAMP[2] |
| MASTER_TX_TIMESTAMP[1] |
| MASTER_TX_TIMESTAMP[0] |
| PAYLOAD[4]... PAYLOAD[LENGTH-1] |
| CRC16[0] |
| CRC16[1] |

FIG. 9B

TIME CORRECTION AND DISTANCE MEASUREMENT IN WIRELESS MESH NETWORKS

CROSS REFERENCE TO OTHER APPLICATIONS

This application claims priority to U.S. Provisional Patent Application No. 60/930,600 entitled TIME OF FLIGHT MEASUREMENT IN WIRELESS MESH NETWORKS filed May 16, 2007 which is incorporated herein by reference for all purposes.

BACKGROUND

Real time location systems (RTLS) are systems that are used to measure the location of objects in real time. RTLS have application in people, equipment, and asset tracking. A substantial number of these applications require measurement accuracy to less than a few meters.

Many existing RTLS use a measurement of the strength of a radio signal (e.g., a received signal strength indication (RSSI)) to indicate distance. RSSI-based RTLS, however, suffers from a number of problems. One problem for RSSI-based RTLS is multipath fading since multipath signals can cause dramatic changes in signal strength even over short distances. Another problem for RSSI-based RTLS is that a site survey (e.g., some position and/or radio signal environment information) is often required in order for RSSI-based RTLS to be useful. In addition, movement of people or objects within a site are also a problem for RSSI-based RTLS; the movement can cause substantial changes in the RSSI-level at a given spot. Due to these problems, RSSI-based RTLS is typically not a sufficiently precise method of measuring location.

Other existing RTLS use the propagation time of radio signals to estimate an object's location. For example, some RTLS use round-trip time of flight—either active such as two-way ranging or passive such as pulse radar, and some RTLS use time difference of arrival—such as is used in global positioning systems (GPS). One problem is that since radio signals propagate at the speed of light (approximately 1 foot in 1 ns), for timing-based RTLS to accurately measuring distance requires being able to measure the time of arrival of a radio signal to a handful of nanoseconds resolution. Another problem for some timing-based RTLS is their use of special modulated signals such as chirps or pulses to enable accurate distance measurement. For example, ultra wideband signals (UWB) use very sharp, fast (e.g., quickly oscillating) pulses to give excellent temporal resolution at a timing-based RTLS receiver; however, there are two problems with UWB systems: 1) the range of UWB signals is not particularly large due to the wide effective noise bandwidth of the receiver, and 2) there is no common frequency band approved worldwide for unlicensed UWB transmission.

BRIEF DESCRIPTION OF THE DRAWINGS

Various embodiments of the invention are disclosed in the following detailed description and the accompanying drawings.

FIGS. 7A, 7B, 8A, 8B, 9A and 9B are block diagrams illustrating embodiments of a portion of a packet at different processing phases during the measurement of a time of flight.

DETAILED DESCRIPTION

Figure 1A:
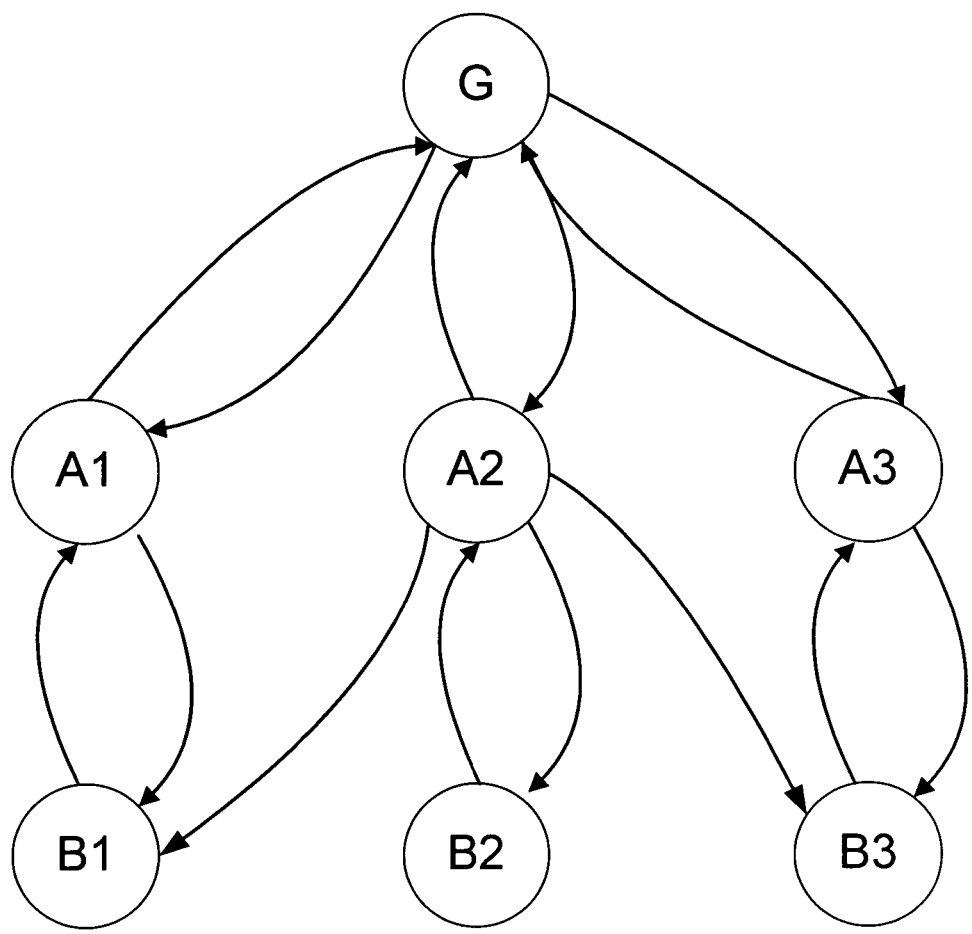
FIG. 1A is a block diagram illustrating an embodiment of a mesh network.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Correcting a time of reception and measuring transceiver-to-transceiver distances are disclosed. The distance between two radio transceivers, $M_1$ and $M_2$, is determined by measuring the amount of time required for an electromagnetic signal to travel between the two transceivers. In various embodiments, the distance is measured by measuring the amount of time for a one way trip between two radio transceivers (e.g., time for a transmission/reception $M_1$->$M_2$ or $M_2$->$M_1$) by measuring the amount of time for a round trip (e.g., time for a transmission/reception $M_1$->$M_2$->$M_1$), or by measuring any other appropriate trip(s) between two or more radio transceivers. A round trip measurement has the advantage that it does not require that the two radio transceivers have time bases with a low absolute error. If a round-trip time measurement is used to determine the distance between the radio transceivers, the turnaround time (e.g., the time taken during the round trip that is associated with the time during which a radio transmission is not traveling between the two radio transceivers) is subtracted from the total round trip time (e.g., the time between a transmission and a reception of a round trip packet).

In some embodiments, the accuracy of the distance determined is improved using a measurement of a correction to the time of arrival of a packet. The correction of the time enables the time to be of higher resolution than a receiving node's clock (e.g., a data clock or receiver clock). The correction of the time is based at least in part on the phase offset of the arriving data bits or chips with respect to a receiving node's clock. In some embodiments, averaging the phase offset measurement reduces noise and increases accuracy of the phase offset measurement.

In various embodiments, other factors accounted for in order to enable an accurate distance measurement are: 1) the relative differences in time base (e.g., a crystal oscillator) frequencies between the two transceivers; 2) the substantial and variable delay of baseband filters (e.g., the filters in a radio receive channel); and 3) the finite precision of a local time base for a transceiver. After determining the travel time between the two transceivers having taken into account the important factors, the distance traveled by the radio transmission is determined by multiplying the travel time by the speed of the radio transmission.

In some embodiments, low- or medium-bandwidth communication protocols, such as the Institute of Electrical and Electronics Engineers (IEEE) standard 802.15.4 or 802.11, determine distance between transceivers using time of propagation of a radio signal. Low- or medium-bandwidth communication protocols have substantially improved minimum detectable signal over ultra wideband signals (UWB) signals and are able to be operated worldwide in the industrial scientific and medical (ISM) license-free bands. In addition, unlike some UWB signal based timing-based RTLS, low- and medium-bandwidth do not require beacons or transmission of tones that are incompatible with FCC certification under 15.247, or other international certification under unlicensed radio frequency bands. In some embodiments, a small number of data packets of a low- or medium-bandwidth system are used to determine a distance measurement. In some embodiments, a small amount of power is used in sending the data packets used to determine a distance measurement.

In some embodiments, existing network protocols are used to make a distance measurement requiring minimal hardware support beyond what is required for implementing the exiting protocol.

FIG. 1A is a block diagram illustrating an embodiment of a mesh network. In the example shown, nodes of a mesh network are connected to each other with directional communication links. The links indicate the direction of transmission of data packets. In some embodiments, there is communication in the opposite direction of the link in order to acknowledge, or not acknowledge, the proper receipt of a data packet after it has been transmitted. Gateway node G is linked to node A1, node A2, and node A3. Node A1 is linked to node G and to node B1. Node A2 is linked to node G, node B1, node B2, and node B3. Node A3 is linked to node G and node B3. Node B1 is linked to node A1. Node B2 is linked to node A2. Node B3 is linked to node A3. In some embodiments, the nodes communicate using radio frequencies that are in the 900-930 MHz or 2.45 GHz industrial, scientific, and medical (ISM) radio band. In some embodiments, the mesh network is compatible with IEEE standard 802.15.4. The IEEE 802.15.4 standard relates to low rate wireless personal area networks. In some embodiments, gateway node G is one of a plurality of gateway nodes. In some embodiments, gateway node G is able to communicate with another network such as a local area network, a wide area network, a storage area network, the Internet, a wired or wireless network, or any other appropriate network.

Figure 1B:
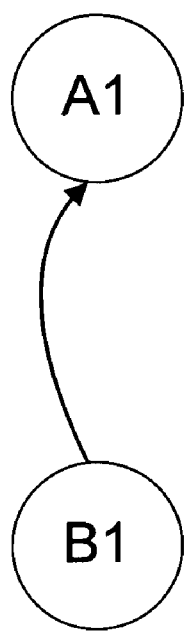
FIGS. 1B and 1C are block diagrams illustrating embodiments of a distance measurement system.
Figure 1C:
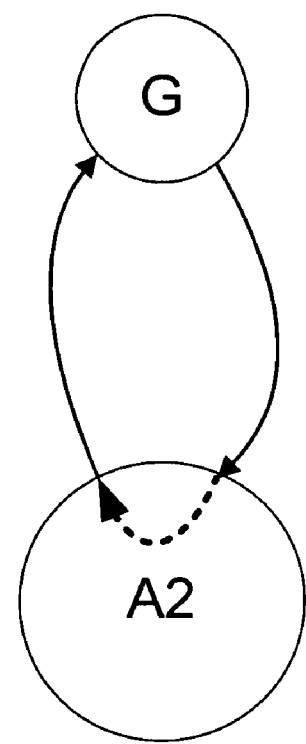

FIGS. 1B and 1C are block diagrams illustrating embodiments of a distance measurement system. In some embodiments, the nodes represented in FIGS. 1B and 1C comprise nodes of mesh network shown in FIG. 1A. In the example shown in FIG. 1B, Node A1 is able to calculate a distance between node A1 and node B1 by measuring the time it takes for a packet to travel between transmission from node B1 and reception by node A1. A first time stamp is included in the packet when the packet is transmitted from node B1. A second time stamp is measured, including, if appropriate, a phase offset measurement, when the packet is received by node A1. The distance between node A1 and node B1 is calculated using the difference between the first time stamp and the second time stamp and the speed of the packet (e.g., the speed of radio waves propagating between node B1 and node A1). Clock skew and/or clock error between a first clock used for determining the first time stamp and a second clock used for determining the second time stamp is accounted for in order to enable an accurate distance measurement.

In the example shown in FIG. 1C, Node G is able to calculate a distance between node G and node A2 by measuring the time it takes for a packet to travel a round trip between from node G to node A2 and back. A first time stamp is noted when the packet is transmitted from node G. A second time stamp is measured, including, if appropriate, a phase offset measurement, when the packet is received by node A2. A third time stamp is measured, when the packet is transmitted by node A2. The packet includes the second time stamp and the third time stamp information and/or the difference between the second time stamp and the third time stamp (e.g., turnaround time). A fourth time stamp is measured, including, if appropriate, a phase offset measurement, when the packet is received back at node G. The distance between node A1 and node B1 is calculated using the difference between the first time stamp and the second time stamp and the difference between the third time stamp and the fourth time stamp and the speed of the packet (e.g., the speed of radio waves propagating between node B1 and node A1). In various embodiments, other combinations of the first, second, third, and fourth time stamps are used for calculation of the distance between node G and node A2. The time taken to turn around the packet within node A2 is referred to as the turnaround time. The turnaround time is time that the packet is not propagating to or from node G and so should be appropriately accounted for when calculating distance between node G and node A2. Clock skew and/or clock error between a first clock used for determining the first and fourth time stamps and a second clock used for determining the second and third time stamps are appropriately accounted for in order to enable an accurate distance measurement.

Figure 1D:
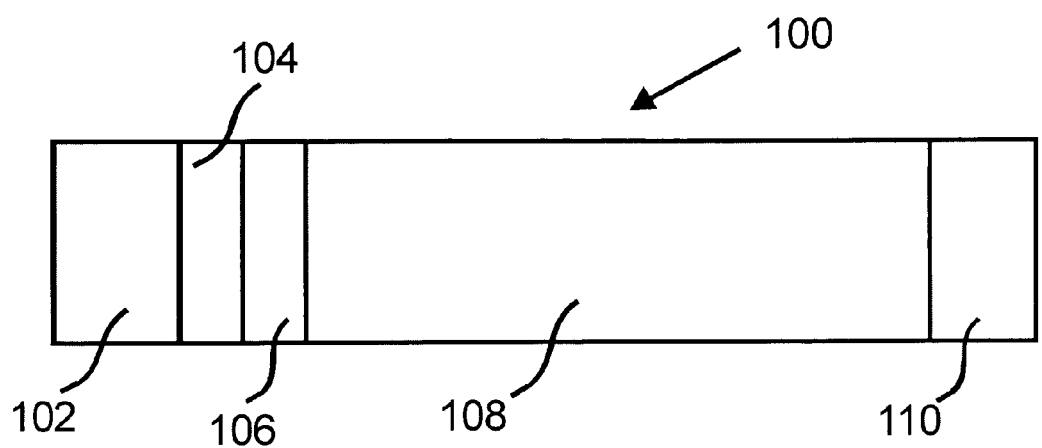
FIG. 1D is a block diagram illustrating an embodiment of a data packet.

FIG. 1D is a block diagram illustrating an embodiment of a data packet. In the example shown, data packet 100 includes preamble 102, start-of-frame delimiter (SFD) 104, packet length 106, payload 108, and checksum 110. Preamble 102 comprises a sequence of bits for synchronizing a clock for reading payload 108. SFD 104 comprises a sequence of bits indicating the start of the information portion of data packet 100. Packet length 106 comprises a series of bits from which the length of payload 108 can be determined. Payload 108 comprises the data payload of data packet 100. In various embodiments, payload 108 includes information that is used to determine time of transmission, time of reception, turn-around time, distance or any other appropriate information for determining distance. Checksum 110 is calculated using a cyclic redundancy check (CRC) operating on payload 108, and is used to determine whether payload 108 has been received without error. In some embodiments, data packet 100 is compliant with Institute of Electrical and Electronics Engineers (IEEE) 802.15.4 standard. Data packet 100 when transmitted from a radio transceiver is transmitted as information encoded in binary form as chips. In various embodiments, chips have a one-to-one correspondence with data bits; data bits are encoded into chips using a chipping sequence; data bits are first encoded into symbols, and the symbols are mapped into a chip sequence, or any other appropriate mapping between chips and data bits. In some embodiments, data packet 100 is used to determine a distance between radio transceivers.

In various embodiments, a timestamp corresponds to a time associated with a start of a start-of-frame delimiter, an end of a start-of-frame delimiter, a center of a start-of-frame delimiter, a start of a preamble, an end of a preamble, a center of a preamble, a start of a packet length field, an end of a packet length field, a center of a packet length field, a start of a checksum, an end of a checksum, a center of a checksum, a start of a payload byte, an end of a payload byte, a center of a payload byte, a start of a payload bit, an end of a payload bit, or a center of a payload bit, or any other appropriate received data bit, byte, or chip.

Figure 2:
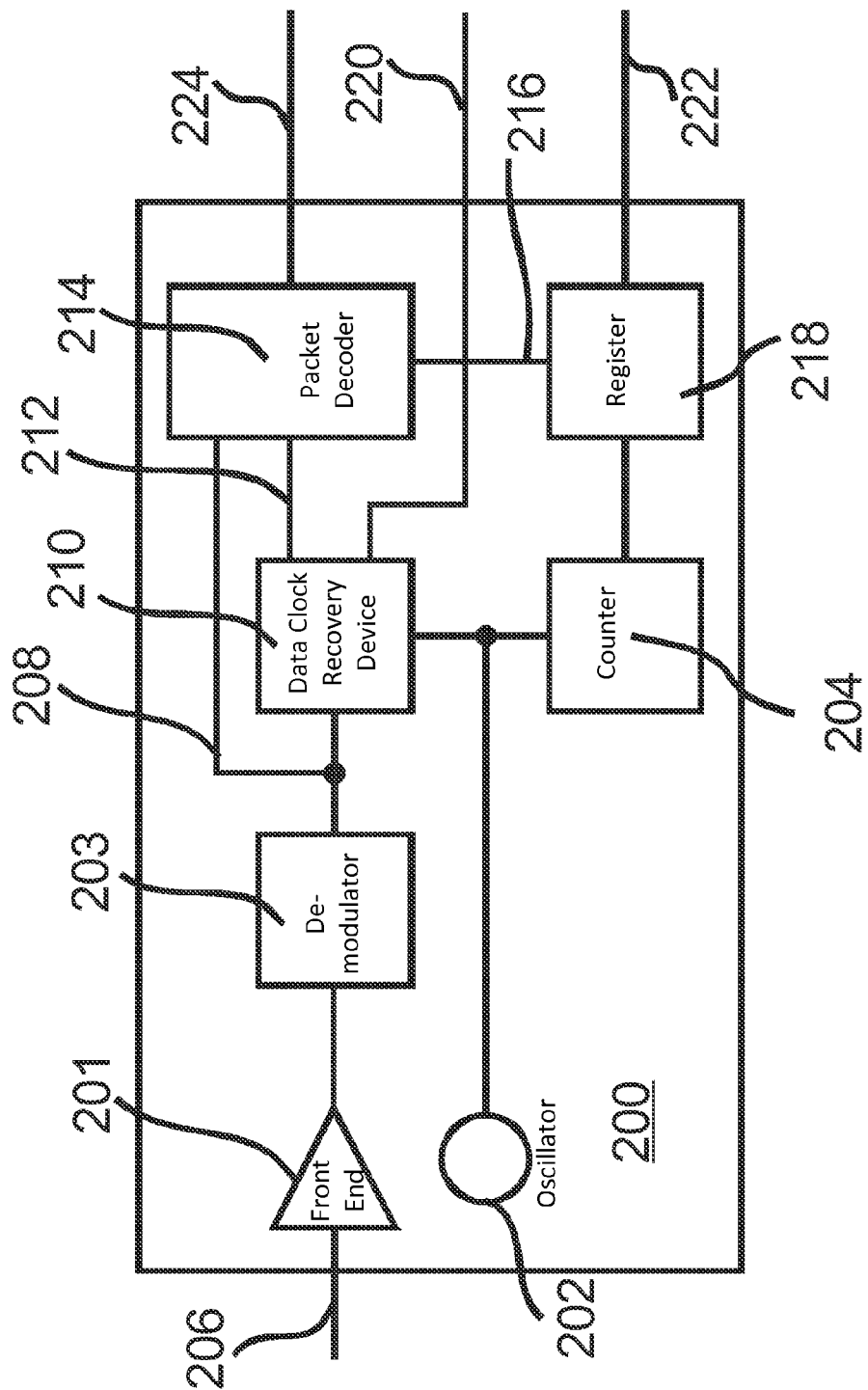
FIG. 2 is block diagram illustrating an embodiment of a receiver.

FIG. 2 is block diagram illustrating an embodiment of a receiver. In the example shown, receiver 200 includes front end 201, oscillator 202 coupled (e.g., coupled directly or indirectly) to counter 204, demodulator 203, data-clock recovery device 210, packet decoder 214, and register 218. Modulated radio-frequency signals enter receiver 200 via input 206. Front end 201 receives the input modulated radio-frequency (RF) signals and converts the input modulated RF signals into an intermediate frequency (IF) signal using a mixer. In some embodiments, front-end 201 includes a low noise amplifier and baseband channel-select filtering. Demodulator 203 converts the intermediate frequency signal to a digital output signal output on digital output 208. The digital output signal on digital output 208 represents un-recovered data chips. To make sense of the data chips, data-clock recovery device 210 is coupled to digital output 208 as well as oscillator 202. A recovered data-clock is presented at output 212; the data-clock is used to sample the digital output signal on digital output 208 to recover data chips. Packet decoder 214 parses the incoming data chips recovered by demodulator 203, determines when a packet has arrived, and outputs decoded packet data on output 224. In some embodiments, packet decoder 214 searches for the start of a valid packet by looking for a preamble sequence (e.g., preamble 102 of FIG. 1D) followed by a SFD (e.g., SFD 104 of FIG. 1D) using a shift register. Upon detecting a valid packet, packet decoder 214 starts decoding the data payload (e.g., payload 108 of FIG. 1D) and outputs a signal on line 216 indicating that a packet is being received. In various embodiments, the signal on line 216 is synchronous with decoding a valid SFD, a valid preamble sequence, a packet length field, a checksum; a particular payload byte (e.g., byte 7 of the payload), a particular payload bit (e.g., bit 54 of the payload), or synchronous with any other appropriate time.

When the signal on line 216 is asserted, counter 204 is sampled by register 218 yielding a timestamp available at output 222. The accuracy of the timestamp sampled by register 218 is limited by several factors including: the temporal quantization error associated with oscillator 202 frequency (e.g., a 20 MHz oscillator gives 50 ns uncertainty in the actual timestamp); phase noise and jitter associated with digital output 208; tracking errors caused by the finite ability of data-clock recovery device 210 to track digital output 208 perfectly; and frequency mismatch between the free-run frequency of the data clock of data-clock recovery device 210 and the chip rate of the received signal. The single sample stored in register 218 provides an estimate of the data packet arrival time that may be improved by measuring the phase offset between when counter 204 was sampled and the actual phase of the chips presented to input 206. The phase offset is measured using data-clock recovery device 210 and presented at output 220.

Figure 3:
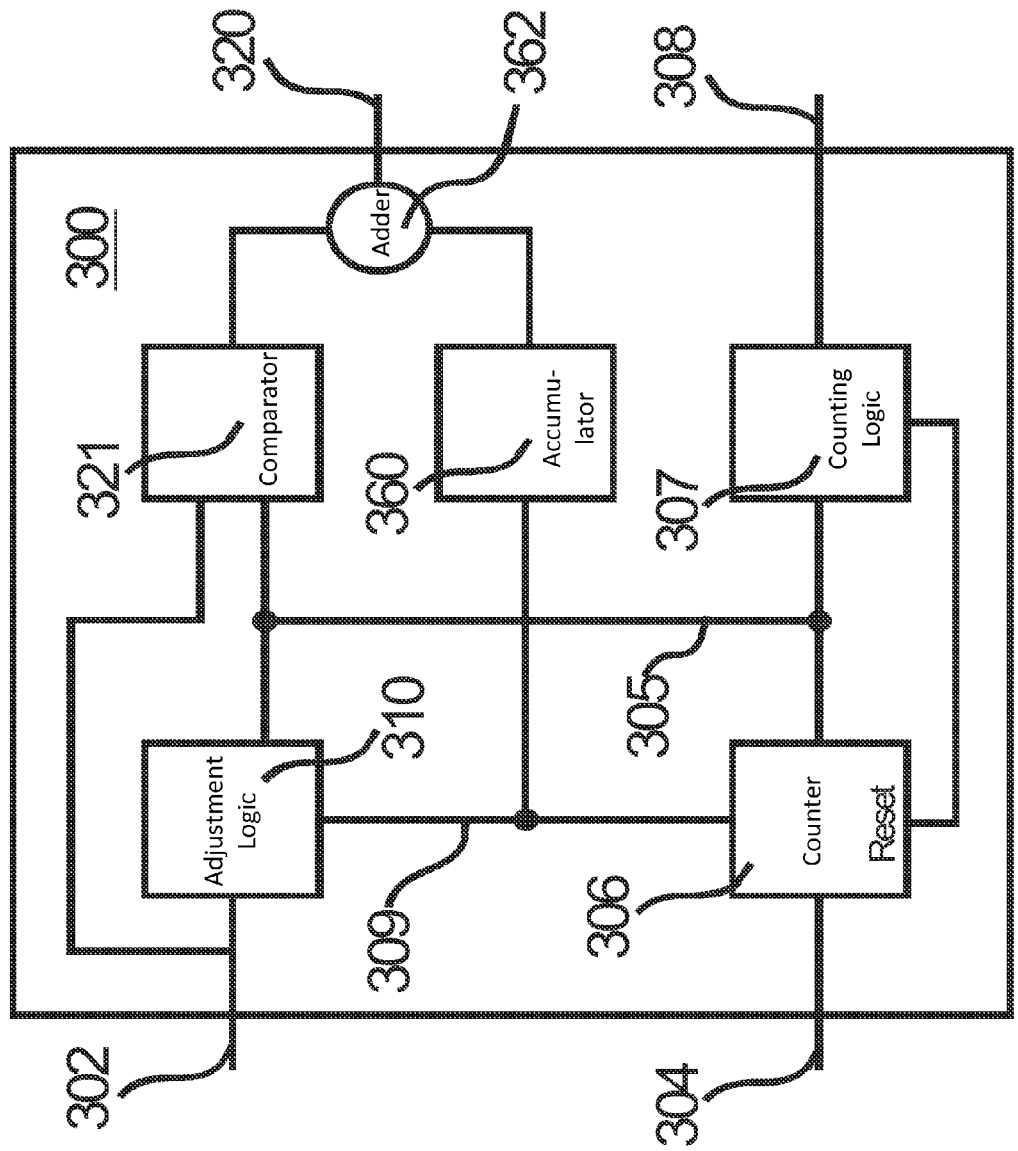
FIG. 3 is a block diagram illustrating an embodiment of a data clock recovery device with a phase-offset output.

FIG. 3 is a block diagram illustrating an embodiment of a data clock recovery device with a phase-offset output. In some embodiments, data clock recovery device 300 is used to implement data clock recovery device 210 of FIG. 2. In the example shown, data clock recovery device 300 includes counter 306, adjustment logic 310, counting logic 307, comparator 321, accumulator 360, and adder 362. Counter 306 counts cycles of an oscillator signal that is input to input 304. In some embodiments, the oscillator signal that is used to drive a counter sampled by a register is also coupled to input 304. In various embodiments, counter 306 counts up or counts down. When counter 306 reaches a predefined threshold, counter 306 is reset by counting logic 307 to an initial count, where it continues counting cycles of the signal input to input 304. In some embodiments, when counter 306 reaches a value approximately half the predefined threshold, counting logic 307 causes data-clock output 308 to go high; when counter 306 reaches the predefined threshold, counting logic 307 causes the data-clock output 308 to go low. The predefined threshold is chosen in combination with the oscillator signal input to input 304 so that the nominal data clock output frequency without corrections from adjustment logic 310 is the nominal data chip rate.

When data input 302 changes value, adjustment logic 310 compares the value stored in counter 306 with a target value and provides an adjustment value on line 309 to the value stored in counter 306 to bring the alignment of the data chips closer to the data-clock edge. In various embodiments, changes in the data chips are aligned to the rising edge of the clock or the falling edge of the clock. In various embodiments, adjustment logic 310 only provides adjustments to counter 306 on logic-low to logic-high transitions of signal input to input 302; only provides adjustments to counter 306 on logic-high to logic-low transitions of signal input to input 302; includes hysteresis so that an adjustment is made to counter 306 only after a number of data-chip edge to data-clock edge comparisons have indicated an adjustment is needed in the same direction, or any other appropriate strategy for aligning data chips to a data clock. In various embodiments, adjustment logic 310 adjusts counter 306 by incrementing by 1, decrementing by 1, incrementing by 0, or any other appropriate adjustment that increments, decrements, or does nothing.

In some embodiments, the oscillator signal that is input to input 304 comprises a 20 MHz oscillatory signal, counter 306 counts from 9 to 0, the free running clock frequency is 2 MHz (e.g., output clock on data-clock output 308), the data clock goes high when the counter equals 9, the data clock goes low when the counter equals 4, the data is sampled on the rising edge, and the data clock is aligned to the falling edge.

Phase-offset output 320 provides a signal that represents the difference in phase between a received chip and the recovered clock with quantization limited by the frequency of oscillator signal that is input to input 304. In some embodiments, phase-offset output 320 is generated by comparator 321 by comparing value of counter 306 (which is coupled to comparator 321 as indicated by line 305) to a target value when a change occurs in the signal input to input 302. Accumulator 360 and adder 362 keep track of adjustments made to counter 306 by adjustment logic 310 so that phase-offset output 320 reflects the phase of a chip with respect to the recovered clock at the time a timestamp was taken. In some embodiments, updates to phase-offset output 320 are qualified so that new values are available only when certain criteria are met. In various embodiments, the phase-offset output is qualified on logic-low to logic-high transitions of data input 302; on logic-high to logic-low transitions of data input 302; when the value of counter 306 is within a few counts of the target value, or any other appropriate qualification criterion or criteria.

Figure 4:
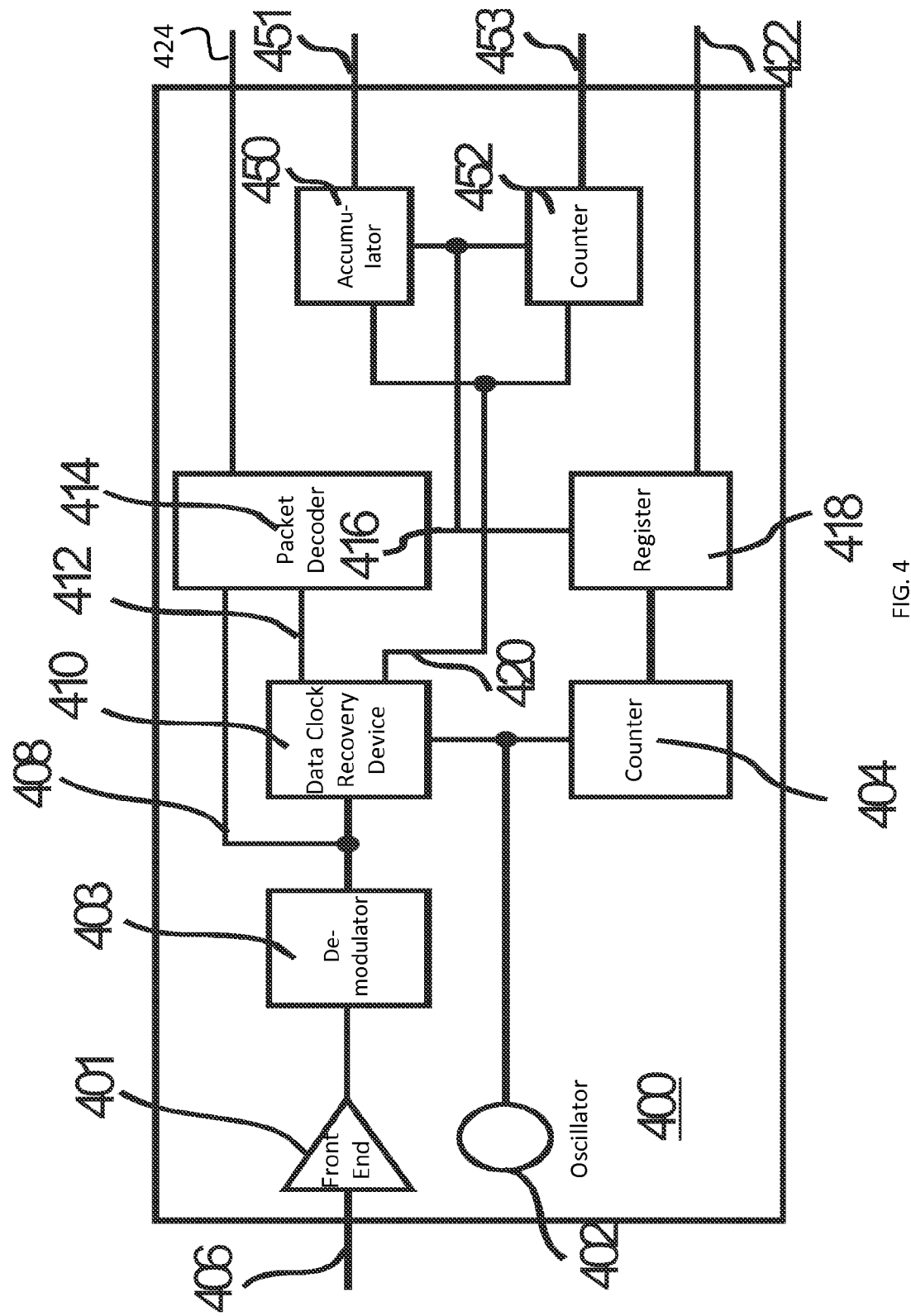
FIG. 4 is block diagram illustrating an embodiment of a phase-offset averager.

FIG. 4 is block diagram illustrating an embodiment of a receiver that includes a phase-offset averager. In the example shown, receiver 400 includes front end 401, oscillator 402 coupled to counter 404, demodulator 403, data-clock recovery device 410, packet decoder 414, register 418, accumulator 450, and counter 452. In some embodiments, receiver 400 is similar to receiver 200 of FIG. 2 except for the addition of accumulator 450 and counter 452. Modulated radio-frequency signals enter receiver 400 via input 406. Front end 401 receives the input modulated RF signals and converts the input modulated RF signals into an IF signal using a mixer. Demodulator 403 converts the intermediate frequency signal to a digital output signal output on digital output 408. The digital output signal on digital output 408 represents unrecovered data chips. To make sense of the data chips, data-clock recovery device 410 is coupled to digital output 408 as well as oscillator 402. A recovered data-clock is presented at output 412; the data-clock is used to sample digital output signal on digital output 408 to recover data chips. Packet decoder 414 parses the incoming data chips recovered by demodulator 403, determines when a packet has arrived, and outputs decoded packet data on output 424.

Upon detecting a valid packet, packet decoder 414 starts decoding the data payload, and outputs a signal on line 416 indicating that a packet is being received. When the signal on line 416 is asserted, counter 404 is sampled by register 418 yielding a timestamp. The signal on line 416 also initiates phase-offset averaging by enabling accumulator 450 to accumulate phase-offset values on line 420 from data-clock-recovery device 410. Counter 452 counts the number of phase-offset values sampled by accumulator 450. In some embodiments, an improved estimate of the time of reception of a data packet is constructed by adjusting the value of the timestamp in register 418 as follows: the value of accumulator 450, presented at output 451, is divided by the value of counter 452 presented at output 453, to yield an average phase-offset. The improved estimate of the time of reception of the data packet is determined using averaging the phase-offsets of multiple chips by correcting a timestamp (e.g., removal of phase offset error from timestamp). In various embodiments, the average is taken over the entirety of a data packet; over only a portion of a data packet, or any other appropriate time windows for averaging.

Figure 5:
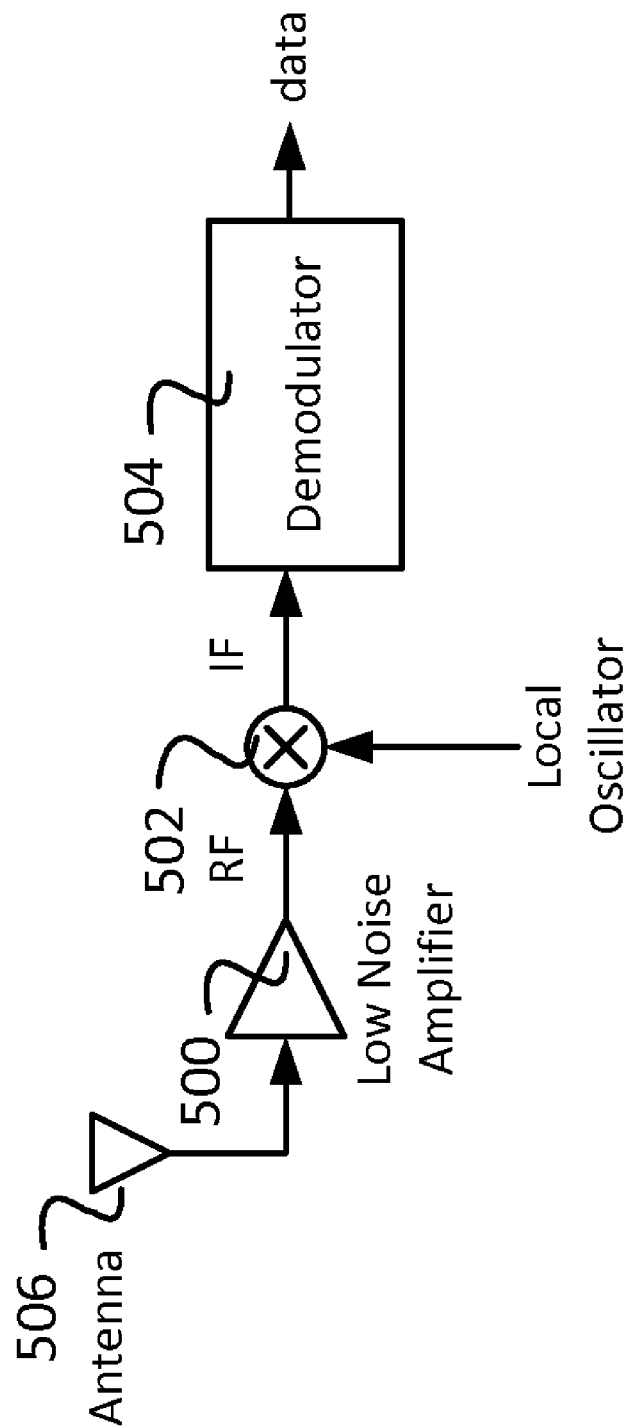
FIG. 5 is a block diagram illustrating an embodiment of a radio receiver that includes a frequency demodulator.

FIG. 5 is a block diagram illustrating an embodiment of a radio receiver that includes a frequency demodulator. In some embodiments, the radio receiver of FIG. 5 is used to implement 201 and 203 of FIG. 2 or 401 and 403 of FIG. 4. In the example shown, a radio signal is received by antenna 506 and amplified by low noise amplifier 500 to create an RF signal. A mixer 502, in combination with a local oscillator, converts the RF signal into an IF signal. Demodulator 504 demodulates the IF signal to a digital chip stream. In some embodiments, demodulator 504 outputs a data clock corresponding to the digital chip stream.

In some embodiments, a skew between the receiver's free-running data clock and the chip rate of the modulated radio-frequency input signal is intentionally introduced to improve averaging performance. For example, if the packet payload length is 4000 chips, the data-clock recovery oscillator input is provided with a 20 MHz signal, the chip rate of the input signal is 2.000000 Million chips per second (Mcps) and the free-running data clock rate of the receiver is 2.000050 Mcps, representing a 50 ppm frequency skew, the data clock adjuster will retard the receiver two 20 MHz cycles over the packet on average.

In some embodiments, the finite precision of a local time base used to drive the counter used for time stamping (e.g., a 20 MHz crystal) is improved using a divided-down version of a local oscillator used for RF to IF conversion (LO). Since the LO is locked to a crystal reference (with great accuracy at DC), a divided down version of the LO may be used to reduce time-base quantization error. While the LO frequency may vary as different channels are selected, the value of the LO is still known with great accuracy, and thus may be compensated for by software.

In some embodiments, noise in the received signal (e.g., an FM demodulated signal) will tend to provide perturbations to aid an averaged measurement.

In some embodiments, the data clock is adjusted to track the chip stream so that the chips may be properly distinguished from one another. For example, the data clock is advanced or retarded by a clock tick (e.g., one clock of a 20 MHz clock) to perform initial synchronization with the chip or bit stream, as well as provide corrections in chip/bit arrival and chip/bit sampling during the reception of a packet.

In some embodiments, the system includes advancing or retarding the data clock to maintain synchronization with the incoming chip/bit. For example, a counter is initialized at the SFD trigger point with 0. Then, for each chip, the edge of the chip is compared with when it is expected. If it is before, 1 would be subtracted from the counter to signify that this sample shows that the actual bit center is negative in time from where the SFD was sampled. If the edge of the chip is after expected, then 1 would be added to the counter to signify that the actual center of the chip is after when it was expected.

In some embodiments, the data clock may be advanced or retarded based upon clock recovery logic. Advancement or retardation of the chip clock is used to adjust how pulses are accumulated in the counter. For example, suppose after 90 chips the clock recovery logic advanced the chip clock by one tick of the clock (e.g., a 20 MHz clock). Now, instead of adding +1 or −1 to the counter based upon the relationship of the clock edge to the chip, the counter would be updated with +2 or 0 instead. If the chip clock was advanced again, the counter would be updated with +3 or +1, based upon the relationship of the clock edge to the chip. If then the chip clock was retarded after advancing the two pulses, +2 or 0 would again be added to the counter based upon the relationship of the chip to the chip clock. At the end of the packet, the counter is divided by the accumulated number of chips to get a mean value of where the true packet received time lies with respect to when you sampled the SFD; that is, this mean value provides a correction factor to the time stamped SFD data. Note that the division by number of chips could be done in software or hardware.

In some embodiments, two-way ranging is used to measure the distance between two transceivers $M_1$ and $M_2$. Relative differences in a local time base introduce timing uncertainties and therefore potential errors in a measurement using the time base. For example, in some embodiments quartz crystals are used on individual transceivers for the radio as a reference. Because of manufacturing variations, these crystals will have a typical variation of up to +/−50 ppm. Calibration may be used to account for some of these variations; however, aging and temperature will still cause errors in the range of 5 ppm or so. Assuming a turnaround time of ~2 ms, a 5 ppm error in time base frequency would yield an error of about 3 meters. Note that in an uncalibrated situation, a 50 ppm error would yield a 30 m error. A better solution that obviates the need for calibration would be to use the radio circuits to measure the relative frequency difference between two radios. Once measured, this difference may be used to correct for errors in a time-of-flight measurement. Two methods are proposed here:

a. $M_1$ sends a packet to $M_2$, then waits a period of time according to $M_1$'s local timebase, say 1 second. $M_1$ then send out another packet. $M_2$ starts a timer upon receiving the first packet, then stops the timer upon receiving the second packet. Given a 20 MHz clock, $M_2$ can discern an error of ~0.05 ppm with a one second interval between packets. The clock used for timekeeping on both $M_1$ and $M_2$ could be the same clock used for the radio (i.e. not a 32 kHz clock). The time interval could also be the nominal packet interval of the network, instead of 1 second.

b. In some embodiments, a radio architecture with a 2.5 MHz low IF baseband circuit is used. If $M_1$ transmits a constant tone to $M_2$, and $M_2$ is tuned to 2.5 MHz below the channel to attain the 2.5 MHz IF in a single conversion step, then the IF frequency will be shifted according to the frequency error according to:

$$\frac{\Delta f}{f} \approx \frac{f_{IF} - 2.5 \text{ MHz}}{f_{LO}}$$

Where $f_{LO}$ is the nominal channel RF frequency and $(\Delta f)/f$ is the frequency error in the crystals $M_1/M_2$. Thus, if both transceivers are configured to the 2.405 GHz channel, and $M_1$ were to emit a constant tone at the channel center and $M_2$ saw a tone at IF of 2.35 MHz, it could be concluded that the time base of $M_1$ was approximately 62 ppm slower than $M_2$.

In some embodiments, instead of a constant tone, an average received frequency for DC-balanced data could be examined, such as dictated by IEEE standard 802.15.4. In a radio with an FM detector, this may be done by simply averaging the value of the FM detector output for the entire packet, and comparing with what the expected average value of the FM detector output should be.

In some embodiments fixed and variable delays (such as variations with temperature or over manufacturing process fluctuations) from filters can introduce timing uncertainties and therefore potential errors in a measurement using the time base. Baseband circuits may contribute substantial delay due to the filters and other finite-bandwidth components in the signal path such as a polyphase filter and, potentially, a received signal strength indicator (RSSI). The value of the delay may be estimated by injecting a small test signal at the IF frequency of interest immediately following mixers and before low frequency baseband processing circuits (i.e. frequencies of interest <10 MHz to 20 MHz), in a radio with mixers. The delay is measured by looking at the delay between the injected signal and when it appears at the output of the baseband signal chain. A high precision clock such as a divided down local oscillator signal may be used for measurement accuracy. The test signal data may be pseudo-noise (PN) data centered about the nominal IF, or a constant tone.

In some embodiments, a time-of-flight (TOF) between transceivers $M_1$ and $M_2$ (e.g., a Master and a Slave) is measured by exchanging packets between them. $M_1$ transceiver initiates the distance measurement by sending a packet; $M_2$ transceiver receives it and sends a packet back to the $M_1$. Hardware support for TOF may include the ability of hardware to timestamp incoming and outgoing packets with a value of a 20 MHz timer. In some embodiments, the 20 MHz timer is associated with a radio oscillator.

Figure 6A:
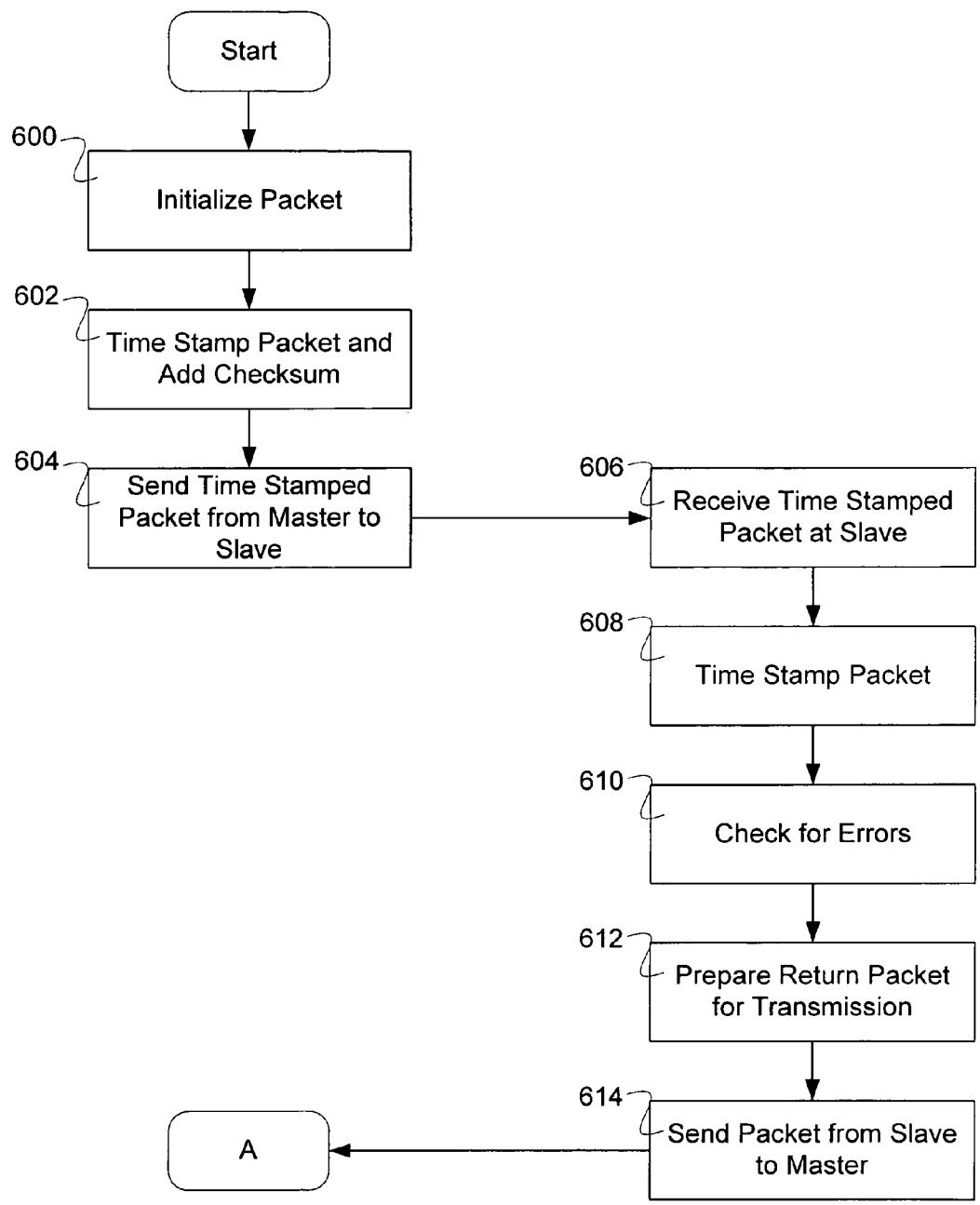
FIGS. 6A and 6B are flow diagrams illustrating an embodiment of a process for measuring a time of flight.
Figure 6B:
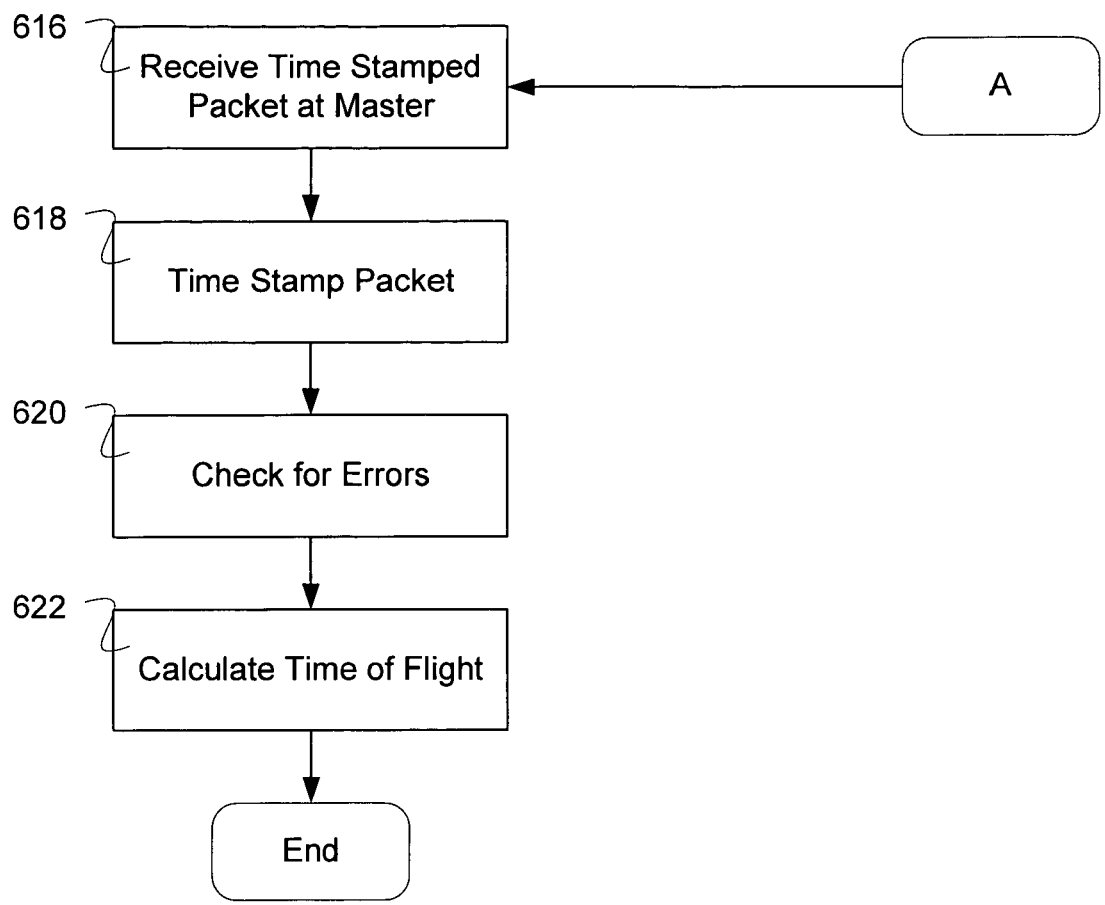

FIGS. 6A and 6B are flow diagrams illustrating an embodiment of a process for measuring a time of flight. In the example shown, in 600 on the Master, a packet is created and initialized. The packet includes four bytes set to 0. In 602, timestamp information is added into the packet as well as a checksum (e.g., a cyclic redundancy check). In 604, the packet is sent from the master to the slave. In 606, the packet is received. In 608, timestamp information is added to the packet. In 610, the packet is examined for errors. In 612, a return packet is prepared for transmission. Preparation includes removing unwanted bytes (e.g., counts and length information as well as transmit checksum) and adjusting the timestamp for time on the slave transceiver. In 614, packet is sent from slave to master. In 616, the packet is received. In 618, the packet is time stamped. In 620, the packet is examined for errors. In 622, the time of flight is calculated. In some embodiments, TOF=MASTER_TX_TIMESTAMP−SLAVE_TIME−MASTER_RX_TIMESTAMP.

Figure 7A:
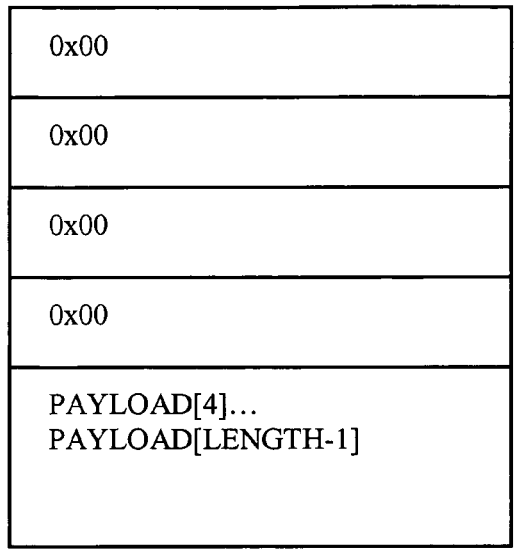
Figure 7B:
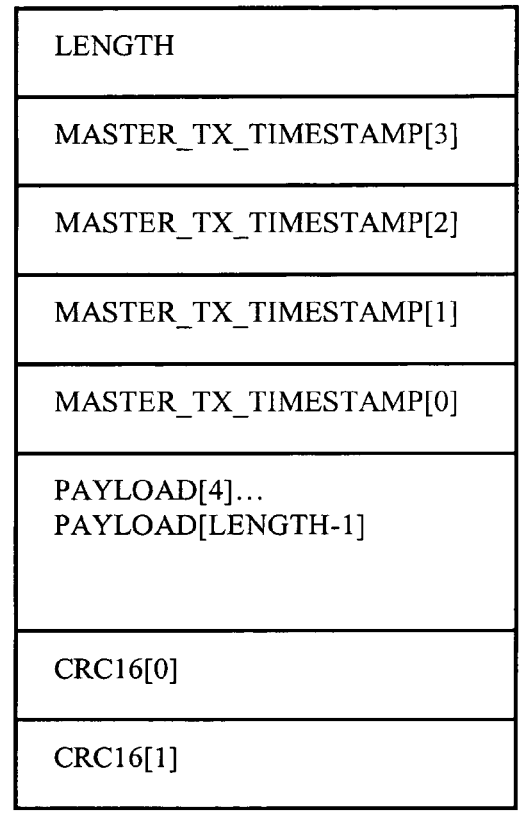
Figure 8A:
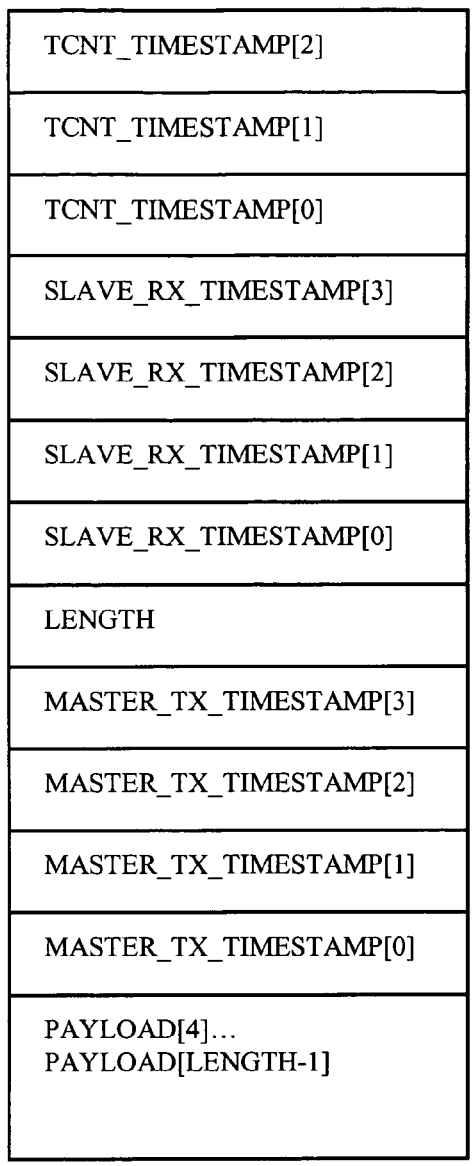
Figure 8B:
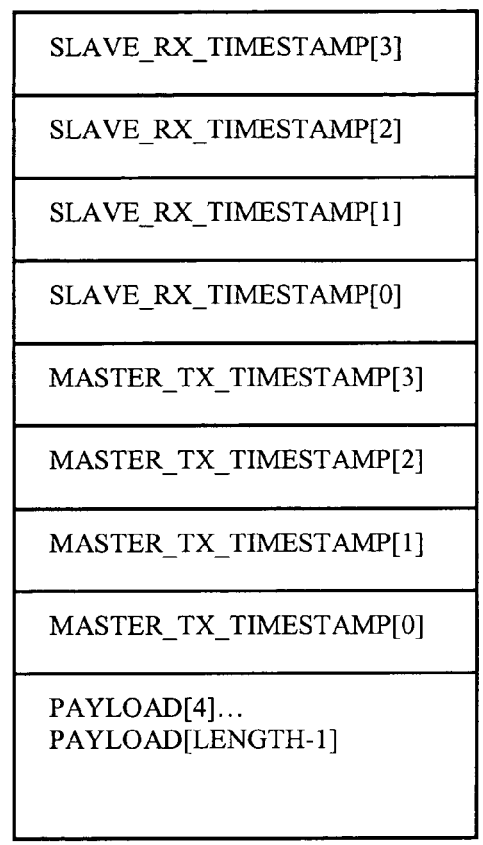

FIGS. 7A, 7B, 8A, 8B, 9A and 9B are block diagrams illustrating embodiments of a portion of a packet at different processing phases during the measurement of a time of flight. In the example shown, FIG. 7A shows an initialized portion of a packet corresponding to 600 of FIG. 6. FIG. 7B shows a time stamped portion of a packet with a checksum corresponding to 602 of FIG. 6. FIG. 8A shows a time stamped portion of a packet after transmission and reception corresponding to 608 of FIG. 6. FIGS. 8B and 9A show a portion of a packet corresponding to two stages of the processing of 612 of FIG. 6. FIG. 9B shows a time stamped portion of a packet after transmission and reception corresponding to 618 of FIG. 6.

In some embodiments, the time from when the slave receives the packet to when the slave transmits the packet is measured and sent to the master in a separate packet from the round trip packets that are timed, as opposed to being stuffed in the round trip packet that is timed for a TOF measurement.

In some embodiments, the master measures the time between sending a packet to the slave and when it receives the return packet from the slave without sending any time information to the slave in the packet; that is the timing information sent in a TOF packet comprises the turnaround time of the slave.

In some embodiments, an average of the estimated arrival time of the packet is measured during the reception of a packet. For example, the average of the estimated arrival time comprises an actual average of the estimated arrival time or a correction factor to be added to a timestamp estimate of the arrival time, such as an average phase-offset. The value is sent in a packet to assist in the calculation of the time of flight. For example, the slave measures the average estimated arrival time of the packet from the master and sends this estimate back to the master to improve TOF accuracy in the master's calculation of the TOF. In various embodiments, the average estimated arrival time is sent in the return packet, in a packet sent to the master after the return packet is sent from the slave back to the master, or any other appropriate packet. In some embodiments, the average of the estimated arrival time is determined using an average phase-offset value as measured by the receiver.

In some embodiments, a second packet sent from slave to master after a predetermined number of slave clock cycles is used to determine the offset in clock frequencies between the master and slave time bases.

In some embodiments, a packet is sent with, for example, a 1 ms total round trip time and then sent again with an intentional delay that makes the total round trip time 2 ms. These differences may be used to back out the time base mismatch between the two time bases of the transceivers (e.g., the difference between their respective crystal oscillator frequencies) and to compensate for the delay. For example, if the total time from when the master sent the packet to when it receives the packet back was 1 ms and the crystal mismatch was +10 ppm (between the two crystals on the different transceivers), you would get say +10 ns of error. Now, intentionally delay the turnaround of the slave by 1 ms to make the total round trip time 2 ms. If the crystal error was 10 ppm you would now get +20 ns of error. Thus, in an ideal system where sensing, receiving, and turning around the packet in a transceiver took zero time it can be inferred that for the 2 ms round trip that it took 10 ns less time than the 1 ms round trip. Note the master, which is in charge of the overall timing and calculation perceives an additional + or − delay because its elapsed time includes the turnaround time and reception time of the slave. The slave reports its own estimate of this time to be subtracted by the master, however, differences between the master and slave oscillators will cause the slave and master to differ in the amount of time accumulated. So, when the slave's time is subtracted form the master's total time a residual (error) remains.

In some embodiments, a number of estimates of time base frequency offsets are calculated for different transmission/reception frequencies (i.e. radio channels). The shortest estimate is more likely to correspond to the actual offset between time bases because longer estimates are likely a result of multi-path propagation between the two transceivers.

Figure 10:
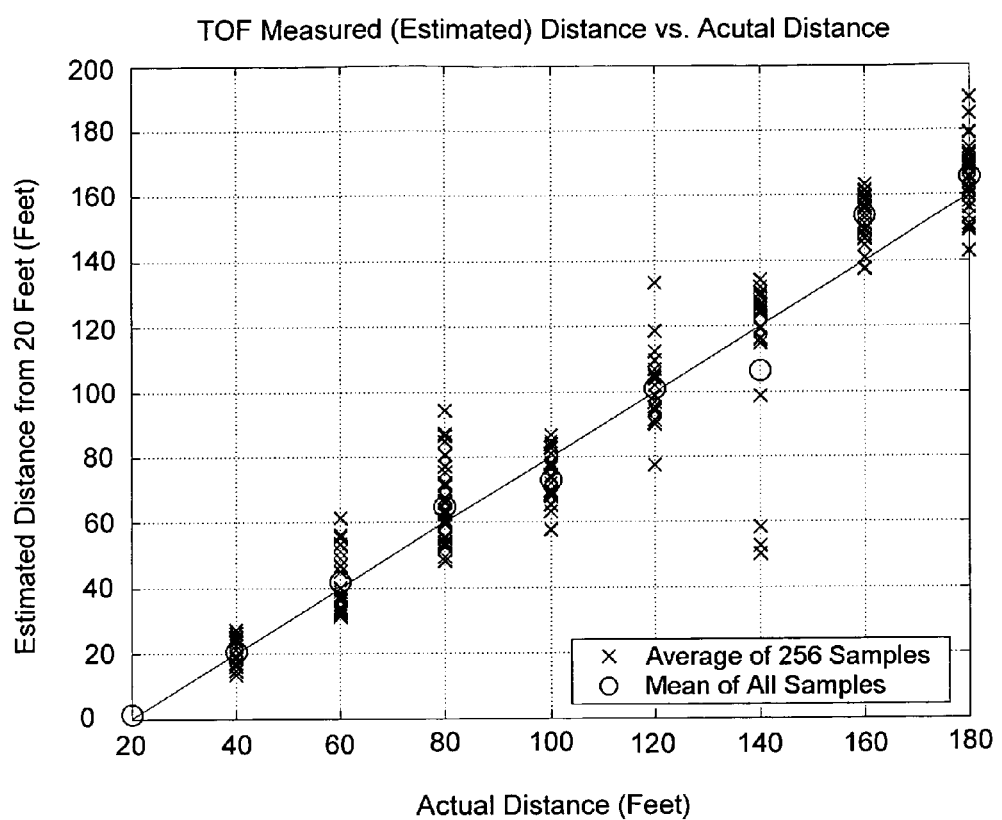
FIG. 10 is a graph illustrating time of flight estimated distances versus actual measured distance between transceivers in one embodiment.

FIG. 10 is a graph illustrating time of flight estimated distances versus actual measured distance between transceivers in one embodiment. In the example shown, averages of 256 samples and the overall average of the measurements are plotted with outliers (e.g., points greater than 2σ from mean) removed. Note that the time of flight estimates appear to be linearly dependent on actual measured distance between transceivers. The measurements were taken outdoors using wireless mesh networking nodes.

Figure 11:
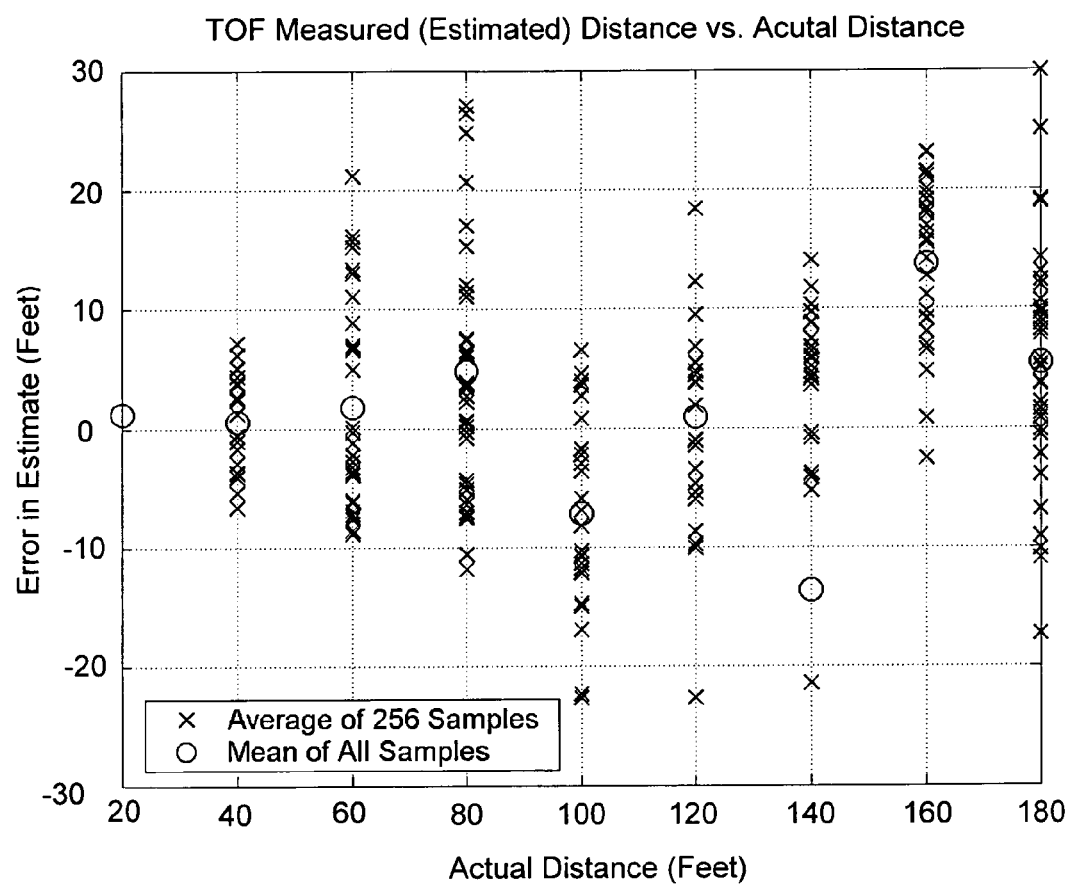
FIG. 11 is a graph illustrating time of flight estimated variation versus actual measured distance between transceivers in one embodiment.

FIG. 11 is a graph illustrating time of flight estimated variation versus actual measured distance between transceivers in one embodiment. In the example shown, the linear component of the estimated distance is removed and the remainder or error is plotted. The outliers have again been removed. Note that the mean of the time of flight estimates appear to be within a ±10% of the actual measured distances. Each x in FIG. 11 represents the average of 256 round trip packets. The measurements were taken outdoors using wireless mesh networking nodes.

Figure 12:
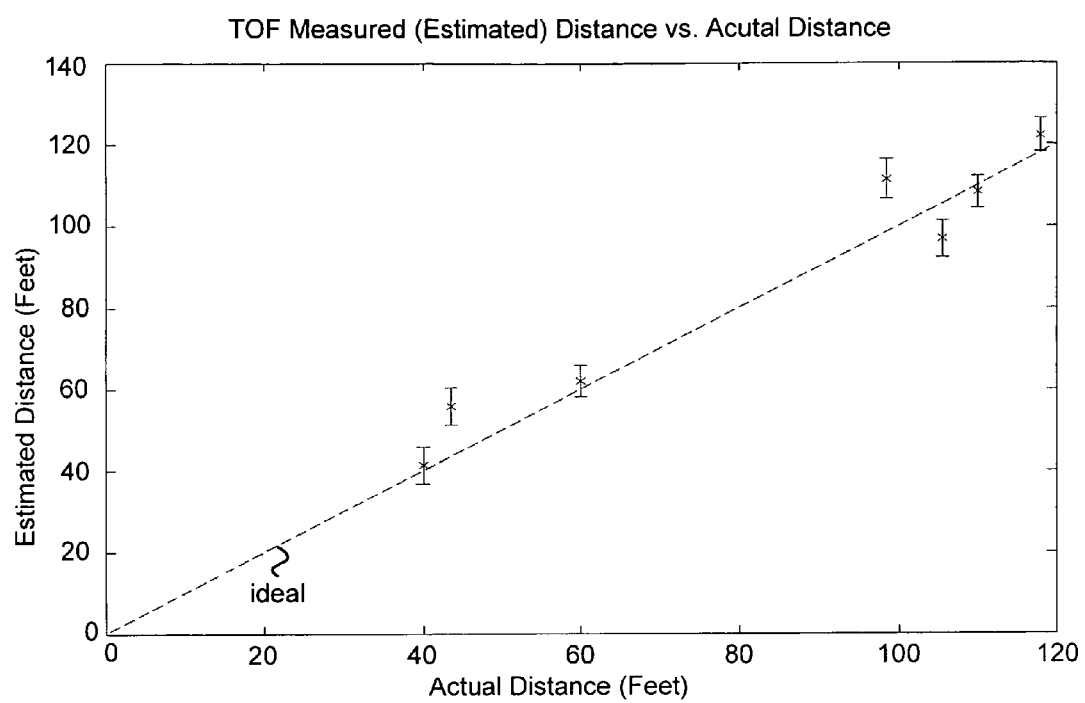
FIG. 12 is a graph illustrating time of flight estimated distances versus actual measured distance between transceivers in one embodiment with phase-offset averaging.

FIG. 12 is a graph illustrating time of flight estimated distance versus actual measured distance between transceivers in one embodiment with phase-offset averaging. In the example shown, timestamps are taken with 50 ns resolution and adjusted using phase-offset averaging over a fifty-byte data packet. Each x represents the average of fifty round-trip measurement of distance based upon time of flight with phase-offset averaging. Error bars represent plus or minus one standard deviation of the distance estimate from one round trip packet. The dashed "ideal" line is drawn with a slope 1 for reference. The time of flight measurements have an average standard deviation over all distances of 4 feet for a single round trip packet. This corresponds to an error of approximately 3 ns in each estimate of the actual time of arrival. Thus, phase-offset averaging improves estimations of distance.

Figure 13:
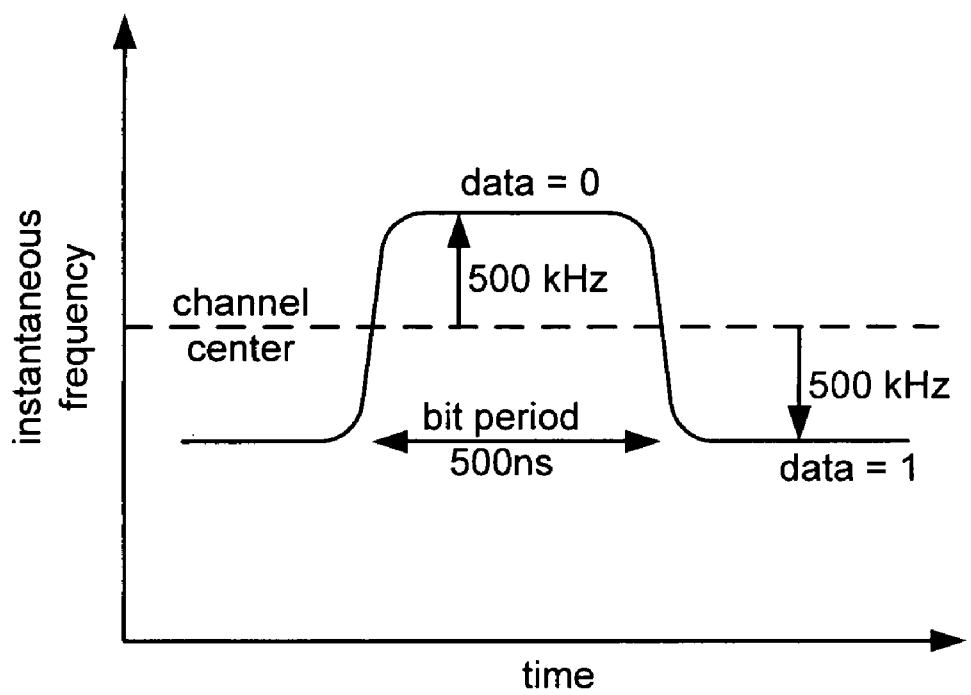
FIG. 13 is a plot illustrating the instantaneous frequency of a frequency-modulated signal carrying binary data, in one embodiment.

FIG. 13 is a plot illustrating the instantaneous frequency of a frequency-modulated signal carrying binary data in one embodiment. In some embodiments, the signal plotted in FIG. 13 represents an instantaneous frequency of the input to demodulator 203 in FIG. 2 or the input to demodulator 403 of FIG. 4. In the example shown, the center frequency is 2.5 MHz and the chip rate (i.e., how often the data can change) is 2 Million chips per second (Mcps), corresponding to a bit period of 500 ns. While a '0' is transmitted the frequency increases to 3.0 MHz, and while a '1' is transmitted the frequency decreases to 2.0 MHz. In some embodiments, '1' corresponds to a decrease in frequency and '1' corresponds to an increase in frequency.

Figure 14A:
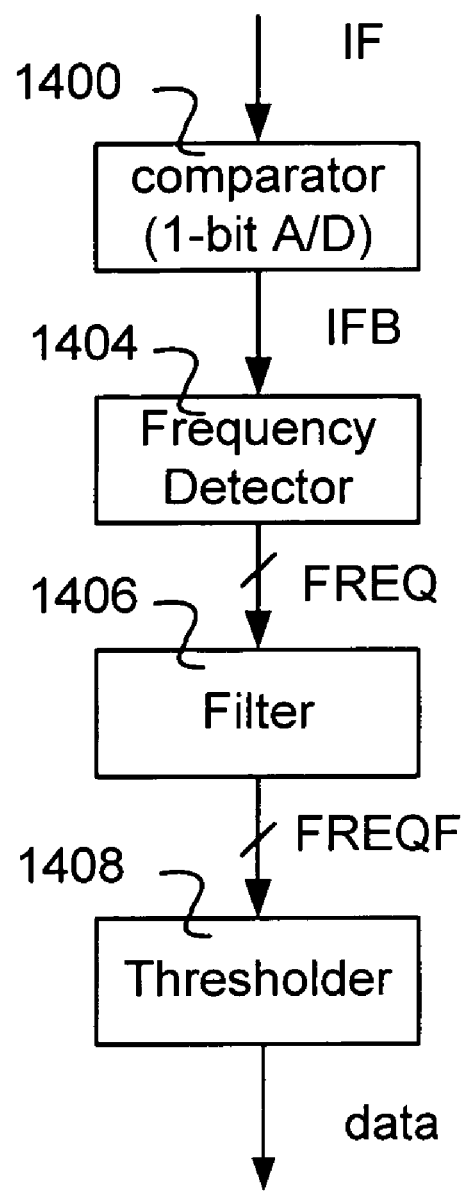
FIG. 14A is a block diagram illustrating an embodiment of a low power frequency demodulator.

FIG. 14A is a block diagram illustrating an embodiment of a low power frequency demodulator. In some embodiments, the frequency demodulator of FIG. 14A is used to implement demodulator 203 of FIG. 2 or demodulator 403 of FIG. 4. In the example shown, an input analog signal IF is converted to a digital signal IFB by comparator 1400. IFB is input to frequency detector 1404 which generates a multi-bit digital output signal FREQ, where each multi-bit digital output corresponds to the frequency of the input signal determined by measuring the time between recent transitions of the input IFB. FREQ is then input to digital filter 1406, which generates a smoothed version of the input signal FREQF. Thresholder 1408 outputs the binary signal 'data' based on whether FREQF is above or below a threshold value. In some embodiments, thresholder 1408 outputs a multi-bit signal by comparing where the value of FREQF falls between a plurality of threshold values, (e.g. 2 bits when the frequency-modulated signal is 4-FSK).

Figure 14B:
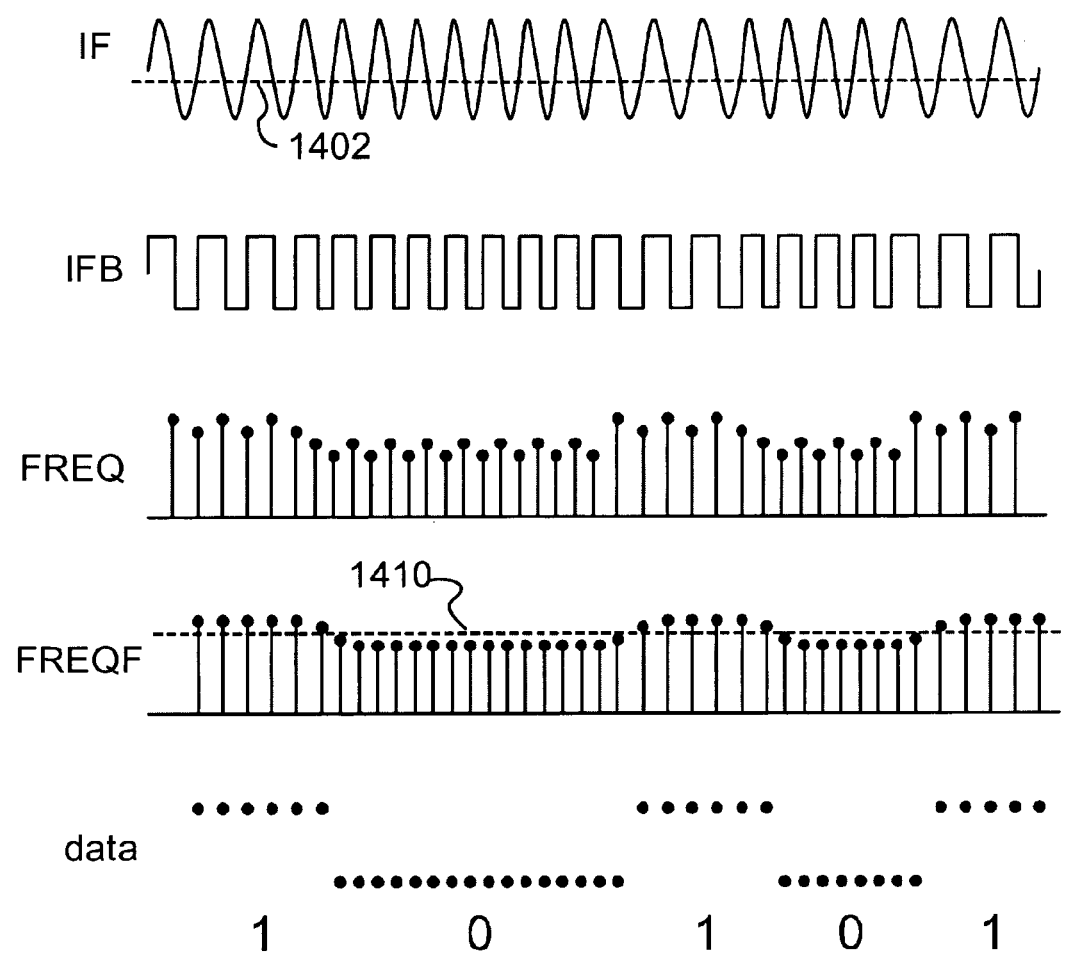
FIG. 14B is a diagram illustrating example signals within the low power frequency demodulator in one embodiment.

FIG. 14B is a diagram illustrating example signals within the low power frequency demodulator in one embodiment. In some embodiments, the signals shown correspond to those named in FIG. 14A. In the example shown, comparator 1400 uses voltage reference 1402 to convert IF into the binary signal IFB. Dual-edged frequency detector 1404 uses high-speed counters to measure the time between transitions in IFB and outputs this information as the multi-bit signal FREQ. While IF is lower than the center frequency, the times between transitions are longer, resulting in higher FREQ values. Conversely, when IF is higher than the center frequency, FREQ is lower. The high-speed counters are clocked by a high-speed clock running at rate fast enough to yield sufficient temporal resolution so that frequency modulation may be properly detected by the frequency detector. In some embodiments, the high-speed counters are clocked by a high speed clock running in excess of 100 MHz to provide accurate temporal resolution. In various embodiments, a high speed clock is generated by dividing down a local oscillator used for converting an RF signal to an IF signal; a high speed clock is generated by multiplying up a reference frequency from a crystal oscillator using a phase-locked loop; a high speed clock is generated by a ring oscillator; a high speed clock is generated by a quartz crystal oscillator operating at an overtone of a crystal resonant frequency; or, any other suitable method of generating a high speed clock.

In some embodiments, the IF signal is a differential analog signal represented by $IF_{pos}$ and $IF_{neg}$. A differential comparator compares the relative polarity of $IF_{pos}$ and $IF_{neg}$, and converts this differential IF signal into the binary signal IFB. A separate reference voltage 1402 is not needed as the quantization is performed by comparing the relative values of $IF_{pos}$ and $IF_{neg}$: common mode is largely rejected.

An offset or slowly-varying error may be present in reference 1402 (when present), or in the IF signal. These errors may come from mismatch or flicker noise for example in the receiver path, the comparator, any channel select filters included after the mixer and before the demodulator, or in the circuits used to gate the high speed counter. Furthermore, there may be other sources of asymmetry in the dual-edged frequency detector due to differences between rise and fall times. These sources of error may translate to a non-50% duty cycle in IFB when IF is unmodulated and at the center frequency. Variations in duty cycle translate to a large frequency measurement error. For example, if the full periods of IF each have a duration of 100 counts of a high-speed counter, but IFB had a duty cycle of 65%, then the FREQ values would alternate between 65 (during the high intervals of the cycle) and 35 (during the low intervals). This error would be overlayed on the real frequency variation, as depicted in FREQ in FIG. 14B. The noise in FREQ could cause a bit to be incorrectly decoded. Such errors degrade receiver sensitivity, because duty cycle variations tend to arise when the amplitude of the RF signal is small. While a frequency detector that provides a new frequency measurement once a cycle by measuring the time between like-signed edges is substantially more immune to duty cycle errors, this type of frequency detector provides an update rate half of a dual-edged frequency detector, making demodulation of low modulation index signals more difficult.

A solution to the duty cycle-induced noise is to use a filter to smooth out the sample-to-sample fluctuations in FREQ to produce a new signal FREQF. A well-designed filter has the advantage of averaging out the effect due to non-50% duty cycle while maintaining the same maximum data rate from the frequency detector. One class of filters that works very well and is easily implemented in CMOS hardware is a sinc filter having a finite-impulse-response. For example: a first order sinc filter with coefficients equal to {0.5, 0.5}, or a second order sinc filter with coefficients equal to {0.25, 0.5, 0.25}. The first filter may be implemented by adding the present and previous value frequency measurements and right shifting by one bit. The second filter may be implemented by adding the present value, the last value (added twice), and the value previous to the last value and right shifting by two bits. Alternatively, instead of right shifting by two bits, the threshold to which the filtered output is compared to discriminate between positive and negative frequencies may be left shifted by 2 bits (equivalent to multiplying by 4). These filters average out the sample to sample variations, effectively nullifying the errors due to non-ideal duty cycle. In addition, their bandwidth is high enough so that they don't have the undesirable effect of filtering out the desired variations in frequency due to the actual modulation. Experimental results showed the addition of a first order sinc filter provided a 9 dB improvement in sensitivity.

The output of the filter FREQF is compared with threshold 1410, which is a function of the high speed clock and the chosen IF frequency. The result of this comparison is used to determine if the data presently being received is a zero or one. The output of this thresholding operation is the demodulator output.

Figure 15:
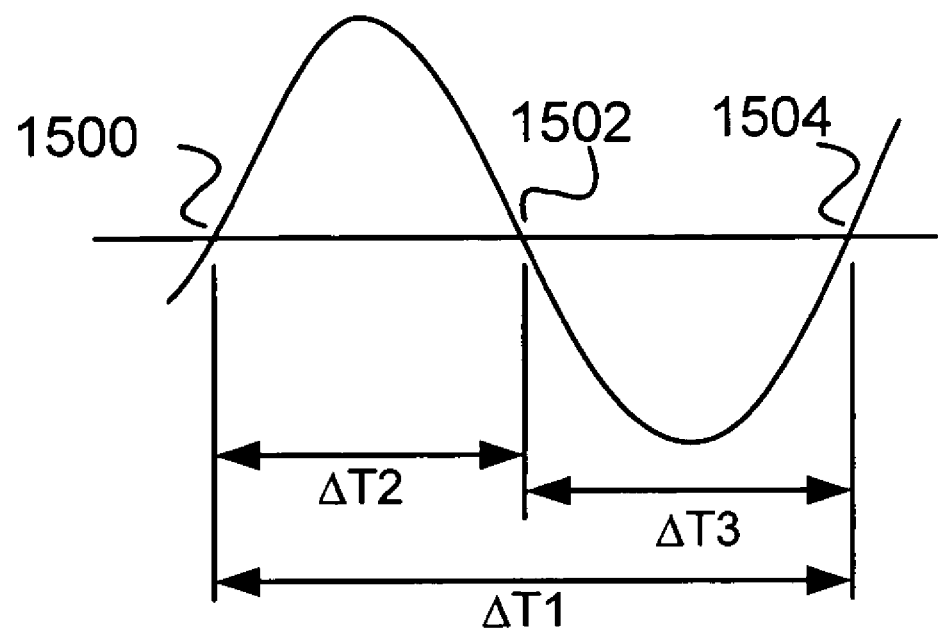
FIG. 15 is a plot of a single cycle of a frequency-modulated signal, defining various time intervals for one embodiment.

FIG. 15 is a plot of a single cycle of a frequency-modulated signal in one embodiment. In some embodiments, this signal is the input to a comparator (e.g., comparator 1400 of FIG. 14A). In the example shown, a frequency detector measures the time between same-polarity edges (e.g., rising edge 1500 to rising edge 1504); that is, it provides a new period estimate (corresponding inversely to a frequency estimate) measurement once a cycle, as shown by reference $\Delta T_1$. In this case, a new time estimate is available at 1504 representing the elapsed time between 1500 and 1504. In some embodiments, such a single-edged frequency detector includes a first counter that starts counting cycles of the high speed clock on a 0->1 transition of the quantized IF signal and stops counting cycles of the high speed clock on the next 0->1 transition. In some embodiments, the frequency detector measures the time between each zero crossing; that is, it provides a new period measurement twice a cycle, as shown by references $\Delta T_2$ and $\Delta T_3$. In this case, a new time estimate is available at 1502 representing the elapsed time between 1500 and 1502; an additional time estimate is available at 1504 representing the elapsed time between 1502 and 1504. A frequency detector that provides a new frequency measurement on every edge is hereby termed a dual-edged frequency detector. In some embodiments, a dual-edged frequency detector includes a first counter that starts counting cycles of the high speed clock on a 0->1 transition of the quantized IF signal and stops counting cycles of the high speed clock on the next 1->0 transition. At this point the first counter value would be presented as the frequency detector output and a new count started with a second counter so that a new result is available at the next 0->1 transition.

Figure 16:
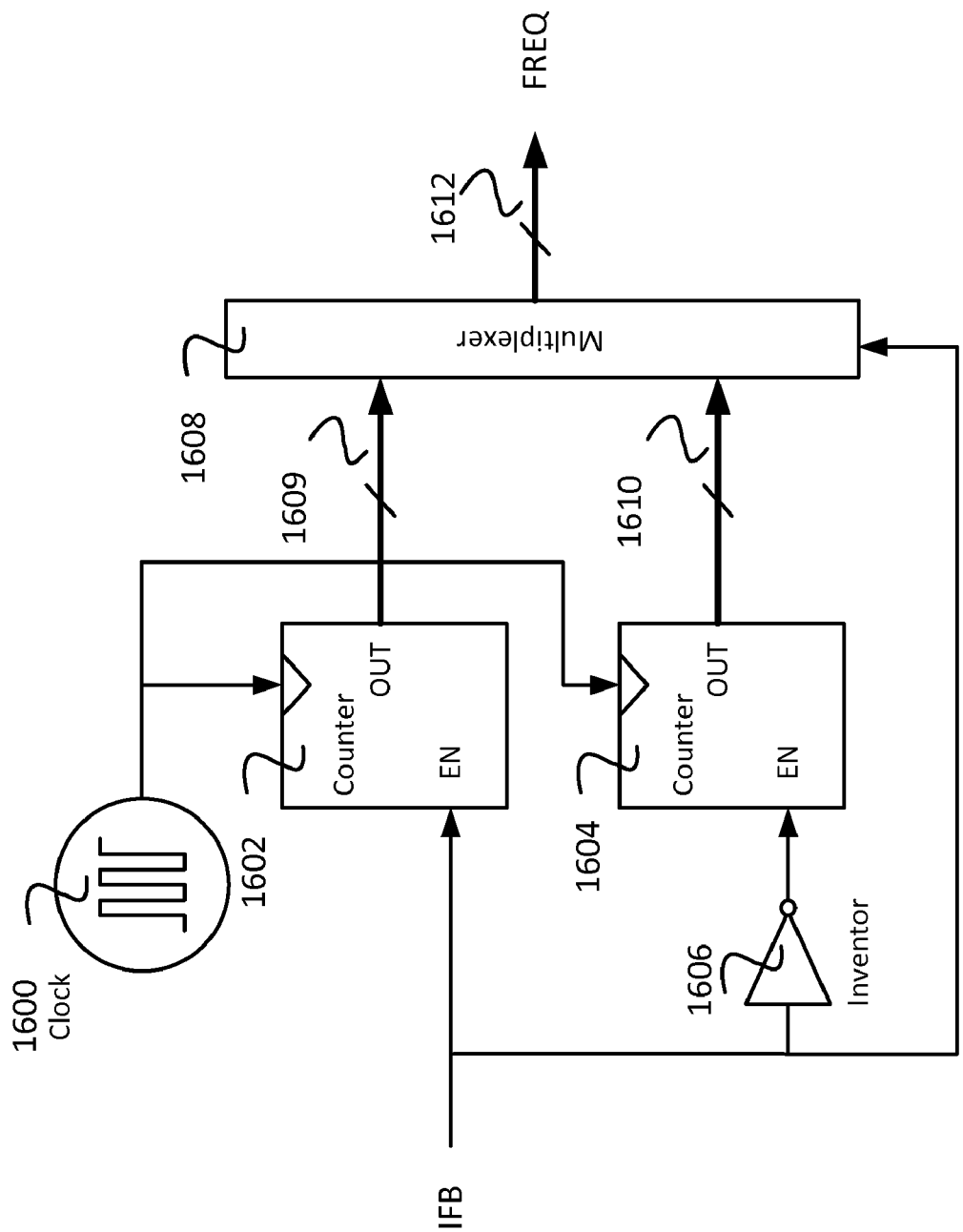
FIG. 16 is a block diagram illustrating an embodiment of a dual-edge frequency detector.

FIG. 16 is a block diagram illustrating an embodiment of a dual-edge frequency detector. In some embodiments, signal IFB is the output of a comparator (e.g., comparator 1400 of FIG. 14A) and the FREQ output is the input to a filter (e.g., filter 1406 of FIG. 14A). In the example shown, high speed clock 1600 provides a signal to counters 1602 and 1604 that cause the counters to increment when they are enabled by the IFB input or the output of inverter 1606. Generally, only one counter is incrementing at a time. For example, counters 1602 and 1604 are enabled when their respective enable inputs (EN) are high. Thus, counter 1602 will increment when signal IFB is high, and counter 1604 is cleared since it is not selected. When signal IFB falls, counter 1602 halts counting and presents its output 1609 to multiplexer 1608 which selects 1609 and presents it to output FREQ. In some embodiments, multiplexer 1608 includes one or more latches to aid in sampling and presenting the data represented by 1609 to output FREQ. After the output 1609 is sampled by latches in the multiplexer, or the multiplexer is sampled by thresholding circuitry, counter 1602 is cleared. Note that as signal IFB falls, signal 1606 output rises, thereby enabling counter 1604 to start counting cycles of high speed counter 1600. When signal IFB rises, counter 1604 halts counting and presents its output 1610 to multiplexer 1608 which selects 1610 and presents it to output FREQ. In some embodiments, multiplexer 1608 includes one or more latches to aid in sampling and presenting the data represented by 1610 to output FREQ. After the output 1610 is sampled by latches in the multiplexer, or the multiplexer is sampled by thresholding circuitry, counter 1604 is cleared.

In some embodiments a dual-edge frequency detector uses a single counter clocked by a high-speed clock to measure the period between IFB edge crossings. IFB is sampled by a D-type flip-flop to synchronize IFB to the high speed clock resulting in a signal $IFB_{SYNC}$. In some embodiments, two cascaded D-type flip-flops are used to prevent meta-stability. The counter is incremented by the high speed clock and is sampled by a first latch on the rising edge of $IFB_{SYNC}$ resulting in an output corresponding to the period between 1->0 and 0->1 transitions of IFB which is presented by a mux to the dual-edge frequency detector output. The counter is then sampled by a second latch on the falling edge of $IFB_{SYNC}$ resulting in an output corresponding to the period between 0->1 and 1->0 transitions of IFB which is presented by a mux to the dual-edge frequency detector output. In some embodiments sequential outputs of the mux are subtracted from each other to account for the fact that the counter is not reset. Two's complement arithmetic aids in subtraction when the counter rolls over. In some embodiments the counter is reset after each transition of $IFB_{SYNC}$ using an asynchronous clear input in the counter driven by a pulse generator that generates a pulse on every edge transition. In some embodiments, the counter is cleared after each transition of $IFB_{SYNC}$ using a synchronous clear input in the counter so that the counter is cleared in the same cycle that the latches sample the counter. In some embodiments, the counter is cleared after each transition of $IFB_{SYNC}$ using a synchronous clear input in the counter so that the counter is cleared in a cycle subsequent to the cycle during which the latches sample the counter.

In some embodiments, a TOF engine embedded inside wireless sensor devices is used as a proximity sensor. This can be used to solve an otherwise difficult problem of associating or binding new devices including handheld devices with a particular network. To associate, each device must be programmed with a network id and optionally security key(s). Correspondingly, a Network Manager is programmed with the same information about each device. Performed manually, this is a difficult, error-prone and potentially insecure set of operations.

In some embodiments, a network manager (NM) (e.g., Security Manager, Wireless base station, etc.) is located in a physically secure location. New devices are brought next to the manager. The manager and each new device mutually confirm that they are close to each other using a time-of-flight measurement and start handshaking. During the handshake, the network manager adds the device's MAC address to its access list. The device (transceiver) programs itself with the NM's network id. If symmetric security is used, programming of keys can also be done at the same time—this may be done at a reduced transmission power to prevent eavesdropping. If public key security is used, this step may not be necessary.

In some embodiments a network manager is in a secure location. A handheld is brought within the vicinity of the manager and proximity is mutually verified. The handheld is programmed with network id and optionally temporary keys. After the handheld is programmed, it can be used in the field to communicate with devices that are already deployed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device for adjusting a time of reception of a data packet, comprising:
   a radio receiver having a radio-frequency input for receiving a radio-frequency signal, a first counter for counting cycles of a clock input signal, and a data output for outputting a stream of digital chips obtained from the radio-frequency signal;
   a data-clock recovery device configured to recover a data-clock clock signal from the stream of digital chips, said data-clock recovery device including a data-clock recovery device input coupled to said data output and a phase-offset output for outputting a phase-offset signal indicative of a phase offset relative to the stream of digital chips,
   wherein the data-clock recovery device comprises a comparator configured to determine whether edges of chips of the stream of digital chips are received before or after expected times for the edges of the chips, and to output the phase-offset signal;
   a second counter configured to be initialized at a time of reception of a data packet;
   circuitry operative, based on the phase-offset signal, to either increment or decrement the second counter based on whether the edges of chips are determined to be received before or after the expected times; and
   a timestamp determining unit configured to take a sampled count value of said first counter at the time of reception of the data packet, wherein said sampled count value provides an estimate of arrival time of said data packet, and to adjust the sampled count value using a value of said second counter to provide a corrected timestamp providing the corrected time of reception of the data packet.

2. A device as in claim 1, wherein the data-clock recovery device further comprises:
   a third counter having an output, said third counter connected to the clock input signal, wherein said clock input signal has a frequency higher than a rate of the radio receiver data output; and
   adjustment logic including a first input and a second input, wherein said first input is coupled to said third counter output and said second input is coupled to said radio receiver data output, and wherein the adjustment logic provides an adjustment to said third counter to maintain alignment of a data-clock recovery device data-clock output with said radio receiver data output.

3. A device as in claim 2, wherein said adjustment to said third counter comprises one or more of the following: an increment, a decrement, an increment by 1, a decrement by 1, and an increment by 0.

4. A device as in claim 2, further comprising:
   a second accumulator having an input and an output, said second accumulator input connected to the adjustment logic, wherein said second accumulator accumulates the adjustment over a time associated with the reception of a data packet.

5. A device as in claim 4, further comprising:
   an adder having a first input connected to said phase-offset output, a second input connected to said second accumulator output, and an output, wherein said phase-offset output is updated periodically.

6. A device as in claim 1 wherein said phase-offset is qualified based at least in part on one of the following: logic-low to logic-high transitions of a data input, logic-high to logic-low transitions of said data input, or when a value of a counter associated with said data clock recovery device is within a few counts of a target value.

7. A device as in claim 1, wherein a data rate associated with the radio-frequency input is skewed in frequency with respect to a free-run clock frequency of the data-clock recovery device.

8. A device as in claim 1, wherein the timestamp corresponds to a time associated with one of the following: a start of a start-of-frame delimiter, an end of a start-of-frame delimiter, a center of a start-of-frame delimiter, a start of a preamble, an end of a preamble, a center of a preamble, a start of a length, an end of a length, a center of a length, a start of a checksum, an end of a checksum, a center of a checksum, a start of a payload byte, an end of a payload byte, a center of a payload byte, a start of a payload bit, an end of a payload bit, or a center of a payload bit.

9. A device as in claim 1, further comprising a demodulator.

10. A device as in claim 9, wherein said demodulator includes a frequency detector.

11. A device as in claim 9, wherein said demodulator includes a dual-edged frequency detector.

12. A device as in claim 1, wherein the phase-offset output of the data-clock recovery device outputs a phase-offset signal indicative of a phase offset between the stream of digital chips and the data-clock clock signal.

13. A method for estimating time of reception of a data packet comprising:
converting a radio-frequency input signal to a data-output signal including a stream of digital chips;
recovering a data clock signal from the stream of digital chips of the data-output signal;
measuring a phase offset between the stream of digital chips of the data-output signal and the data clock signal, by determining whether edges of chips of the stream of digital chips are received before or after expected times for the edges of the chips;
sampling a first counter at a time of reception of the data packet;
initializing a second counter at the time of reception of the data packet;
incrementing or decrementing the second counter based on whether the edges of chips are determined to be received before or after the expected times; and
calculating a corrected time of reception of the data packet based at least in part on the sampled count value of the first counter at the time of reception of the data packet and on a count value of the second counter, wherein the sampled count value provides an estimate of arrival time of said data packet, and wherein the count value of the second counter is used to improve the estimate of arrival time.

14. A method as in claim 13, wherein the determining comprises determining whether edges of chips of the stream of digital chips of the data-output signal occur before or after expected times for the edges of the chips measured with respect to the data clock.

15. A method as in claim 13, wherein converting the radio-frequency input comprises:
detecting a first edge event and a second edge event, wherein the second edge event comprises an edge event subsequent in time to the first edge event; and
determining a data bit based at least in part on a timing interval between the first edge event and the second edge event.

16. A method as in claim 15, wherein the timing interval is determined by counting a number of cycles of a high-speed oscillator occurring in a time elapsing between the first edge event and the second edge event.

17. A device for estimating a time of reception of a data packet in a wireless mesh network, comprising:
a radio receiver having a radio-frequency input for receiving a radio-frequency signal, an oscillator for outputting an oscillator clock signal, a first counter incremented by said oscillator, and a data output for outputting a stream of digital chips of the radio-frequency signal;
a data-clock recoverer, wherein said data-clock recoverer recovers a data clock associated with said stream of digital chips of the data packet at the data output and measures a phase-offset between the stream of digital chips of the data packet at the data output and the recovered data clock,
wherein the data-clock recoverer comprises a comparator configured to determine whether edges of chips of the stream of digital chips are received before or after expected times for the edges of the chips, and to output the phase-offset signal;
a second counter configured to be initialized at a time of reception of a data packet;
circuitry operative, based on the phase-offset signal, to either increment or decrement the second counter based on whether the edges of chips are determined to be received before or after the expected times; and
a time reception corrector for providing a corrected time of reception of the data packet, wherein said corrected time of reception is based at least in part on said measured phase-offset and a timestamp comprising a sampled count value of said first counter at the time of reception of the data packet,
wherein said sampled count value provides an estimate of arrival time of said data packet,
wherein a value of the second counter is used to improve the estimate of arrival time.

\* \* \* \* \*